United States Patent [19]
Knutson et al.

[11] Patent Number: 5,930,309
[45] Date of Patent: Jul. 27, 1999

[54] RECEIVER SIGNAL PROCESSING SYSTEM FOR CAP SIGNALS

[75] Inventors: Paul Gothard Knutson; John Stewart; Kumar Ramaswamy, all of Indianapolis, Ind.

[73] Assignee: Thomson Consumer Electronics, Inc., Indianapolis, Ind.

[21] Appl. No.: 08/805,198

[22] Filed: Feb. 27, 1997

[51] Int. Cl.$^6$ .................................................. H03D 1/00
[52] U.S. Cl. .......................... 375/340; 375/340; 375/316; 370/342
[58] Field of Search .................................. 375/200, 206, 375/261, 222, 298, 340, 321, 350, 219, 324, 326, 344, 355, 316; 370/342; 342/389; 348/735

[56] References Cited

U.S. PATENT DOCUMENTS

| | | | |
|---|---|---|---|
| 4,785,463 | 11/1988 | Jane et al. ................................. | 375/206 |
| 5,386,239 | 1/1995 | Wang et al. ............................. | 348/472 |
| 5,521,938 | 5/1996 | Stewart et al. .......................... | 375/206 |
| 5,572,264 | 11/1996 | Mizukami et al. ..................... | 348/735 |
| 5,623,487 | 4/1997 | Natali ..................................... | 370/342 |

OTHER PUBLICATIONS

Floyd M. Gardner, *A BPSk/QPSK Timing–Error Detector for Sampled Receivers*, IEEE Transactions on Communications, vol. COM–34, No.5, May 1986, pp. 423–429.

Edward A. Lee et al., *Digital Communication, Second Edition* © 1994 by Kluwer Academic Publishers, Sec.2.4 p. 18 to Sec.6.8 p. 235.

J. J. Werner, *Tutorial on Carrierless Am/PM—Part I—Fundamentals and Digital Cap Transmitters*, Minneapolis, MN, Jun. 23, 1992.

David A. Bryan, *QAM for Terrestrial and Cable Transmission*, IEEE Transactions on Consumer Electronics, vol.41, No.3, Aug. 1995, pp. 383–391.

Liu et al., *Simulation and Implementation of US QAM--Based HDTV Channel Decoder*, IEEE Transactions on Consumer Electronics, vol.39, No.3, Aug. 1993, pp. 676–683.

Neil K. Jablon, *Joint Blind Equalization, Carrier Recovery, and Timing Recovery for High–Order QAM Signal Constellations*, IEEE Transactions on Signal Processing, vol.40, No.6, Jun. 1992, pp. 1383–1397.

Werner, Tutorial on Carrierless AM/PM—Part I Fundamentals and Digital CAP Transmitter, ANSI X3T9.5 TP/PMD Working Group, Minneapolis, Jun. 23, 1992.

*Primary Examiner*—Stephen Chin
*Assistant Examiner*—Shuwang Liu
*Attorney, Agent, or Firm*—Joseph S. Tripoli; Eric P. Herrmann; Ronald H. Kurdyla

[57] ABSTRACT

A CAP signal is processed by a QAM demodulator network. The QAM network causes the CAP signal to rotate about its center frequency, which rotation is removed prior to conveying the CAP signal to utilization networks. In an analog implementation, the CAP signal is frequency upconverted to be centered at Fad/4 so that the QAM processor can use the usual 1, 0, -1, 0 demodulation sequence to bring the CAP signal to baseband. Alternatively, using digital techniques, frequency upconverting is not needed and the 1, 0, -1, 0 demodulation sequence is replaced with a Numerically Controlled Oscillator and full multiplier to allow the QAM processor the bring the CAP signal to baseband.

8 Claims, 3 Drawing Sheets

RECEIVER SIGNAL PROCESSING SYSTEM FOR CAP SIGNALS

BACKGROUND OF THE INVENTION

1. Field of the Invention

The present invention relates to a digital signal processing system, and in particular to a receiver for processing carrierless AM/PM (CAP) signals.

2. Description of the Related Art

CAP transceivers are used to transmit and receive modulated signals over a transmission medium, such as an asymmetric digital subscriber line (ADSL) application. CAP is a bandwidth-efficient two-dimensional pass band line code in which the symbol data is organized in I and Q pairs. In this system, the I and Q data are filtered with orthogonal I and Q band pass filters having a common pass band. CAP is primarily intended for use in relatively simple communication links, where there is only one frequency division per channel. With CAP, all processing is done in the pass band of the filters, which eliminates the need for a carrier tracking loop (CTL), at the expense of tighter symbol timing constraints due to the frequencies of the pulses transmitted, which are higher than those of many other modulation schemes. CAP systems are described in detail in Werner, J. J., *Tutorial on Carrierless AM/PM,* Jun. 23, 1992 (UTP Development Forum, ANSI X3T9.5 TP/PMD Working Group).

Many end users do not have CAP transceivers capable of receiving such CAP signals. For example, many consumers have existing cable set-top transceiver devices which are not compatible with CAP. Because of the often prohibitive cost of installing new CAP receivers compatible with CAP signals, it is desirable to modify existing receivers to be able to receive CAP signals.

SUMMARY OF THE INVENTION

In accordance with the principles of the present invention, a method for processing a CAP signal to facilitate its demodulation to baseband involves the steps of processing the CAP signal by a QAM demodulator network, and removing rotation of the CAP signal about its center frequency caused by QAM demodulator processing.

DESCRIPTION OF THE PREFERRED EMBODIMENT

Symbol Constellations

In the present invention, a QAM receiver is modified to receive CAP signals. In either a CAP or QAM system, a transmitted data symbol is represented by both "I" and "Q" quadrature components. Each symbol may comprise several bits, and the number of bits/symbol dictates the type of QAM (or CAP) system, i.e., 16-QAM, 32-QAM, and so forth. In a 16-QAM system, for example, 16 possible 4-bit symbols exist, each of which is mapped (assigned) to a prescribed coordinate in a four-quadrant grid-like constellation using a look-up table (e.g., a ROM). A prescribed number of symbols occupy assigned areas in each quadrant. In a 32-QAM (or 32-CAP) system, each quadrant of the constellation contains eight symbols at prescribed coordinates with respect to quadrature I and Q axes.

CAP Transceiver System

Figure 1:
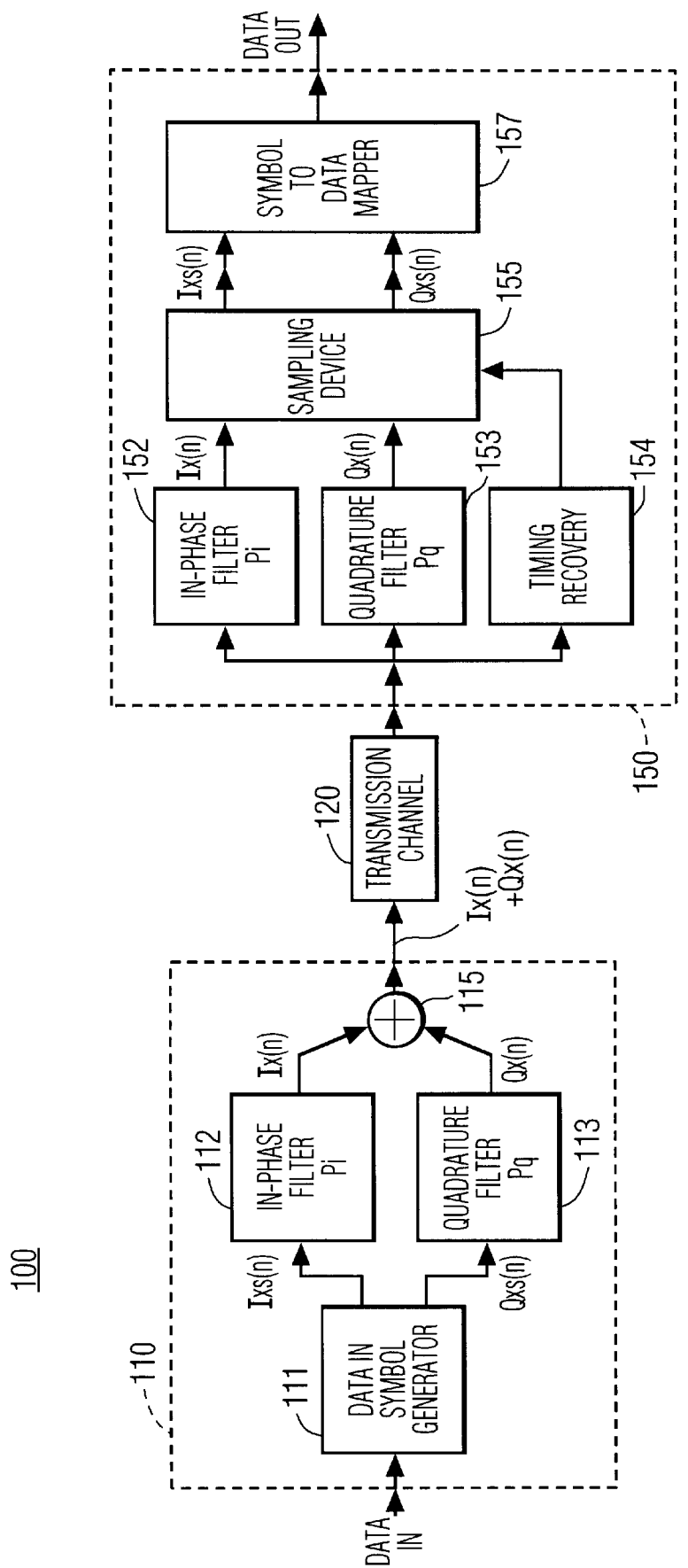
FIG. 1 is a block diagram of a CAP transceiver system.

Referring now to FIG. 1, there is shown a block diagram of a CAP transceiver system 100, containing CAP transmitter 110, CAP receiver 150, and transmission channel 120. CAP transmitter 110 comprises symbol generator 111, in-phase filter 112, quadrature filter 113, and summing node 115, which is coupled to transmission channel 120. CAP receiver 150 comprises in-phase filter 152, quadrature filter 153, and timing recovery mechanism 154, each coupled to transmission channel 120, sampling device 155, which is coupled to symbol to data mapper 157. In one embodiment, transmission channel 120 is a standard telephone twisted pair wire.

Symbol generator 111 receives an input data signal Data In, and maps each input data value to be transmitted to a symbol pair or pair of coordinates Ixs and Qxs of a corresponding constellation point on a complex signal constellation having real I (in-phase) and imaginary Q (quadrature) axes. Ixs and Qxs are spaced by L-1 zeros, where L is the number of samples per symbol. Filters 112 and 113 are orthogonal pulse shaping filters having a common pass band. Filters 112 and 113 receive symbols Ixs(n) and Qxs(n), and generate signals Ix(n) and Qx(n), respectively, where n is the sample index, and $Ix(n)=Pi*Ixs(n)$, and $Qx(n)=Pq*Qxs(n)$. The pulse shaping filter functions Pi, Pq of filters 112, 113 are derived by frequency shifting a common M tap root raised cosine filter, P, to Fc, where Fc is the center or carrier frequency of the pulse shaping filter functions Pi and Pq of filters 112 and 113. Thus, $Pi_k = P_k \cdot \cos((2 \cdot \pi \cdot Fc \cdot k)/(Fs \cdot sps))$, and $Pq_k = P_k \cdot \sin((2 \cdot \pi \cdot Fc \cdot k)/(Fs \cdot sps))$, for $k=-(M/2), -(M/2)+1, \ldots (M/2)-1$, where the value sps represents the number of samples per symbol used in the filter, Fs is the symbol rate, and k is an index variable. Thus, unlike in QAM transmitters, as discussed below with reference to FIG. 2, the input symbol data Ixs(n) and Qxs(n) are not rotated; rather, the input symbol data are only filtered by the root raised cosine orthogonal bandpass filters 112, 113. This generates a CAP signal which resembles, in some respects, a QAM signal, except the transmitted data is not spinning or rotating at carrier frequency Fc as it would be in a QAM system.

The summed signal Ix(n)+Qx(n) output by summing node 115 is transmitted over transmission channel 120. As will be appreciated, the summed signal lx(n)+Qx(n) is typically passed through a digital-to-analog converter (DAC) and interpolating low-pass filter (not shown) before being transmitted over transmission channel 120. Further, in an alternative embodiment, summing node 115 may subtract, rather than add, the signals Ix(n) and Qx(n).

The signal Ix(n)+Qx(n) is received by Pi and Pq filters 152, 153 of CAP receiver 150, which are related in phase and magnitude response to filters 112, 113 of CAP transmitter 110. CAP receiver 150 has a structure that is similar to the structure of CAP transmitter 110 in that it has a parallel arrangement of in-phase and quadrature filters. Filters 152, 153 generate signals Ix(n) and Qx(n), which are provided to sampling device 155. Timing recovery means 154 recovers the timing of the transmitted data, and supplies timing data to sampling device 155 to properly sample signals Ix(n) and Qx(n), to generate Ixs(n) and Qxs(n), which are used by symbol to data mapper 157 to provide the coordinates of the corresponding constellation point and thus to provide the data represented by the constellation point.

QAM Transceiver System

Figure 2:
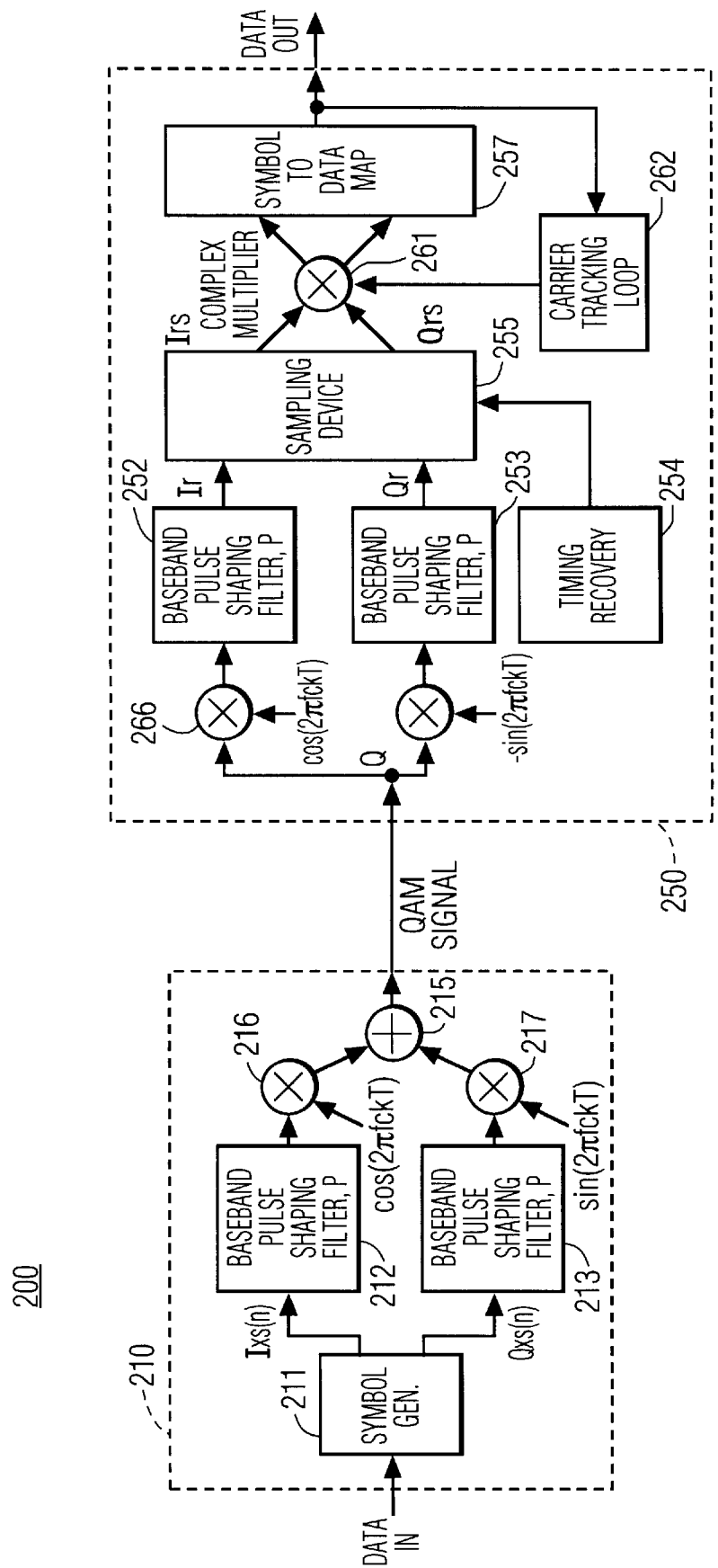
FIG. 2 is a block diagram of a QAM transceiver system.

Referring now to FIG. 2, there is shown a block diagram of a QAM transceiver system 200, containing QAM transmitter 210 and QAM receiver 250. QAM transmitter 210 comprises symbol generator 211, baseband pulse shaping filter 212, baseband pulse shaping filter 213, multipliers 216 and 217, and summing node 215, which is coupled to QAM receiver 250 via a transmission channel (not shown). QAM receiver 250 comprises multipliers 266, 267, baseband pulse shaping filters 252, 253, timing recovery mechanism 254, sampling device 255, complex multiplier 261, carrier tracking loop (CTL) 262, and symbol to data mapper 257.

In QAM transmitter 210, the entire signal is modulated to frequency Fc, as opposed to frequency shifting the filters as is done with CAP system 100. Consequently, the pulse shaping filter functions P of filters 212, 213 are invoked at baseband, and the upconverted signal rotates at rate Fc. At QAM receiver 250, the process is reversed to restore the mapped, modulated, and transmitted data. QAM systems are discussed in Werner, *Tutorial on Carrierless AM/PM*, referenced above, and in Edward A. Lee & David G. Messerschmitt, *Digital Communication*, 2d ed. (Boston: Kluwer Academic Publishers, 1994), pages 20 et seq., 202 et seq., and 220 et seq.

In QAM transceiver system 200, symbol generator 211 receives an input data signal Data In, and maps each input data value to be transmitted to a pair of coordinates Ixs and Qxs of a corresponding constellation point, as in the CAP system 100 of FIG. 1. The Ixs(n) and Qxs(n) symbols generated by symbol generator 211 are passed through baseband pulse shaping filters 212, 213, respectively, to produce band-limited I and Q values. These band-limited I and Q values are multiplied by a carrier and a version of that carrier shifted in phase by 90 degrees by modulators 216, 217, respectively. The combination of these modulations causes the I and Q values to rotate in the complex plane about the carrier frequency, as will be understood by those skilled in the art. Modulator 216 multiplies the band limited I value by $\cos(2\cdot\pi\cdot Fc\cdot k\cdot T)$, and modulator 217 multiplies the band limited Q value by $\sin(2\cdot\pi\cdot Fc\cdot k\cdot T)$, where Fc is the center frequency of baseband pulse shaping filters 212, 213, k is an index variable, and 1/T is the symbol rate. A QAM signal can thus be seen to consist of two independently modulated carrier signals with a $\pi/2$ or 90 degree relative phase shift. Filters 212, 213 and filters 252, 253 are square-root raised-cosine (SQRC) filters. The cascade of filters 212 and 252, and of filters 213 and 253, each form a so-called "Nyquist filter," which achieves minimal inter-symbol interference according to Nyquist's theory.

The resulting modulated signal streams are added by summing node 215 to form the QAM signal, which is thus seen to provide separate double-sideband modulation of the I and Q signals superimposed in the frequency domain. Typically, an upconverter (not shown) translates the low-frequency QAM signal to the transmission channel of interest, e.g. a VHF or UHF channel. Also, the QAM signal is typically passed through a DAC and interpolating low-pass filter (not shown) before being transmitted over the transmission channel.

The QAM signal is received by a tuner portion (not shown) of QAM receiver 250, which filters the selected channel and reduces the frequency of the received signal down to an intermediate frequency (IF), the output of which is applied to multipliers 266 and 267. The components of QAM receiver 250 generally perform inverse functions to their counterpart components in QAM transmitter 210. For example, receiver 250 also contains SQRC I and Q filters 252, 253, which are "matched" to the transmit pulse shape. The QAM signal received by QAM receiver 250 is converted down to baseband by multiplying the received signal by multipliers 266, 267. This also causes the QAM signal to be largely derotated. Any residual rotation and phase error is removed by CTL 262. Next, filters 252, 253 generate signals Ir(n) and Qr(n), which are provided to sampling device 255. Sampling device converts the received analog signal to digital by sampling. Timing recovery mechanism 254 recovers the timing of the transmitted data, and supplies timing data to sampling device 255 to enable sampling device 255 properly to sample signals Ir(n) and Qr(n), which in turn generates Irs(n) and Qrs(n).

Signals Irs(n) and Qrs(n) are then applied to complex multiplier 261, which receives a tracking signal from CTL 262 to remove residual rotation and constellation phase error left over after the multiplication of multipliers 266, 267. CTL 262 receives the data out signal and applies the tracking signal to complex multiplier 261, as will be appreciated by those skilled in the art. The outputs of complex multiplier 261 are applied to symbol to data mapper 257 to provide the coordinates of the corresponding constellation point and thus to provide the data represented by the constellation point. In an alternative embodiment, the received QAM signal is converted to digital by an analog-to-digital converter ADC before being applied to multipliers 266 and 267. In this case, sampling device 255 is replaced by an interpolator, as will be appreciated by those skilled in the art.

Receiving CAP Signal with QAM Receiver

As will be appreciated by those skilled in the art, QAM system 200 contains a control loop not found in CAP system 100. In a QAM system, both the carrier frequency, Fc, and the symbol timing clock must be phase and frequency locked to the transmitter. In a CAP system, only the symbol timing information must be locked. In a standard QAM receiver, the QAM receiver is designed to demodulate a QAM signal having a center frequency Fc of _ the ADC sample rate Fad of sampling device 255, i.e., Fc=Fad/4. This allows the use of a 1,0,–1,0 sequence to demodulate the received QAM signal with multipliers 266, 267. In such a sequence, the cosine and sine signals transmitted to multipliers 266, 267 of QAM receiver 250 may simply be a 1,0,–1,0 sequence, which allows the use of simple multiplexer devices to be used to perform the functions of multipliers 266, 267. The relationship Fc=Fad/4 is advantageously used with sinusoidal (sine/cosine) multiplier functions associated with the 1, 0, –1, 0 sequence. However, other relationships between Fc and Fad could also be used in accordance with the requirements of a particular system. Alternatively, if an ADC is used at the input of multipliers 266, 267, multipliers 266, 267 are digital multipliers or mixers of a digital demodulator comprising a numerically controlled oscillator (NCO).

In the present invention, one of two modifications is made to a QAM receiver to enable the QAM receiver to receive a CAP signal. To center a CAP signal at the frequency Fc at which the QAM receiver can use the 1,0,–1,0 sequence for demodulation, the CAP signal may be converted up and down in the analog frequency domain. Alternatively, where a digital demodulator is used, the digital demodulator may be modified to accept center frequencies other than Fad/4, so that the CAP signal need not be converted up and down in the analog frequency domain before being applied to the input of the modified QAM receiver. Accordingly, in one embodiment of the present invention using analog techniques, as discussed below with reference to FIG. 3, a received CAP signal is shifted to being centered at Fad/4, so that the standard 1,0,−1,0 demodulator system in the QAM demodulator can bring the signal to complex baseband. In a second embodiment using digital techniques, as discussed below with reference to FIG. 4, the 1,0,−1,0 demodulation of a digital demodulator is changed to incorporate a full multiplier and NCO to allow the QAM receiver to shift the input CAP signal to baseband. To remove the rotation left after a CAP signal is received by a QAM receiver by either of these techniques, the CTL is also modified to remove this rotation, as discussed with respect to FIG. 5.

Modified QAM Receiver: Analog Technique

Figure 3:
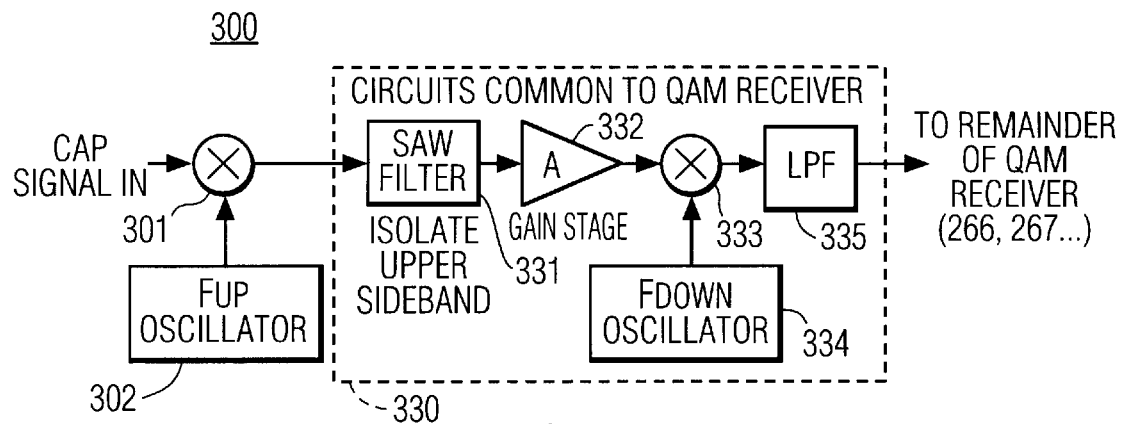
FIG. 3 is a block diagram of a portion of a modified QAM receiver modified in accordance with an embodiment of the present invention.

Referring now to FIG. 3, there is shown a block diagram of a portion 300 of a modified QAM receiver, which is modified in accordance with the analog technique described above to be able to receive CAP signals transmitted by a CAP transmitter such as CAP transmitter 110 of FIG. 1. In QAM receiver portion 300, an Fup oscillator 302 and mixer 301 are added to the input stage of a standard QAM receiver. The output of mixer 301 is applied to the input of tuner stage 330, which utilizes components common to a standard QAM receiver tuner. Tuner stage 330 comprises a surface acoustic wave (SAW) filter 331, a gain stage 332, a multiplier 333, and Fdown oscillator 334, and low pass filter 335.

In QAM receiver portion 300, an input CAP signal is applied to multiplier 301, which upconverts the CAP signal up to a higher frequency. With typical bits rates, such as DAVIC (Digital Audio Visual Integrated Circuit Council) bit rates C and D, a filter with a sharpness similar to that of a SAW filter is required to separate the upper sideband of the converted signal from the lower sideband. Thus, the output of multiplier 301 is applied to the input of SAW filter 331 of stage 330. The frequency Fup generated by oscillator 302 is selected to put the upper sideband of the upconverted signal generated by mixer 301 in the passband of SAW filter 331. Within stage 330, Fdown oscillator 334 is selected to center the signal at Fc=Fad/4, or _ the ADC sample rate of sampling device 255.

The output of stage 330 is applied to the remainder of a QAM receiver, which is identical to QAM receiver 250 of FIG. 2, except for a modification to the CTL derotator, discussed with reference to FIG. 5. In particular, the output of stage 330 is applied to the input of multipliers 266 and 267 of QAM receiver 250 of FIG. 2. After the demodulation of multipliers 266, 267, the demodulated CAP signal is rotating about its center frequency Fc, unlike a QAM signal, which would be largely derotated at this point of QAM receiver 250. Accordingly, in order to derotate the symbols received, the CTL needs to be modified to provide an Fc derotator. Thus, with the embodiment illustrated in FIG. 3, the CTL derotator is also modified, as discussed below with respect to FIG. 5.

Modified QAM Receiver: Digital Technique

Figure 4:
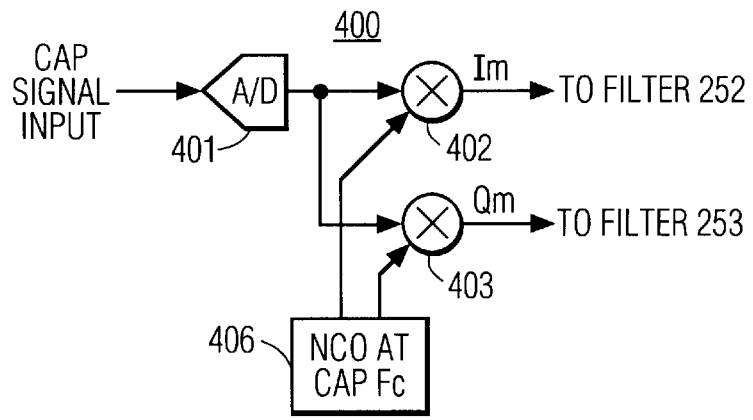
FIG. 4 is a block diagram of a portion of a second modified QAM receiver modified in accordance with a second embodiment of the present invention.

Referring now to FIG. 4, there is shown a block diagram of a digital CAP to QAM interface portion 400 of a second modified QAM receiver, which is modified in accordance with the digital technique described above to be able to receive CAP signals transmitted by a CAP transmitter such as CAP transmitter 110 of FIG. 1. In QAM interface portion 400, the 1,0,−1,0 digital demodulator of a standard QAM receiver is replaced with the digital CAP to QAM interface 400 of FIG. 4, at the intermediate frequency (IF) input of the QAM receiver. Interface 400 incorporates a full multiplier (eg., a complex multiplier) and NCO to allow the QAM receiver to shift the input CAP signal to baseband. With appropriate gain adjustment, the CAP signal can thus be applied directly to the ADC 401, without having to be upconverted as done in QAM receiver portion 300.

Interface 400 comprises ADC 401, coupled to inputs of multipliers or mixers 402 and 403. These multipliers replace the function of multipliers 266 and 267 of QAM receiver 250 of FIG. 2. The outputs of multipliers 402 and 403 are applied to filters 252 and 253, the output of which is applied to sampling device 255, which is an interpolator in this embodiment, since analog-to-digital conversion has already been performed. An NCO that provides center frequency Fc of the received CAP signal is also applied to inputs of multipliers 402 and 403. This replaces the simpler 1,0,−1,0 sequence that is used when the input signal has a frequency of Fad/4. Full multipliers 402 and 403 are also used in this embodiment, rather than simpler multipliers possible when the NCO generates the simpler 1,0,−1,0 sinusoidal sequence.

With this embodiment, the CTL derotator is also modified, as discussed below with respect to FIG. 5.

Modified CTL Derotator of QAM Receiver for Analog and Digital Techniques

Carrier tracking is an integral part of the QAM demodulation performed by a QAM receiver such as QAM receiver 250. A CAP system avoids this problem by not rotating data on a carrier frequency. However, it has been determined that, if a QAM receiver is to demodulate a CAP signal and frequency conversions are part of the signal processing performed, then it is likely that carrier tracking will be needed, since the frequency converters will rotate the data. Fortunately, when the static center frequency is added to the CTL NCO, the offsets introduced by conversion tuning errors are comparable to those that exist with a QAM system and can be corrected in the standard manner.

Figure 5:
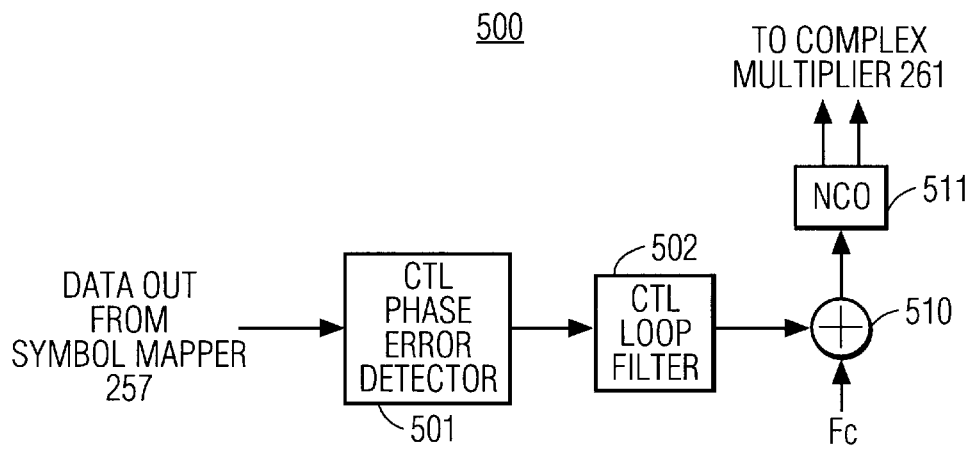
FIG. 5 is a block diagram of a modified carrier tracking loop of the QAM receiver of FIGS. 4 or 5, in accordance with the present invention.

Referring now to FIG. 5, there is shown a block diagram of a modified CTL 500, which replaces CTL 262 of QAM receiver 250, in accordance with the present invention. This modification is necessary since the CAP symbols are rotated at Fc when they are converted to baseband by multipliers 266 and 267 (for FIG. 3) or multipliers 402 and 403 (for FIG. 4). When a CAP signal is received by a QAM receiver, the CAP signal is not rotating as a QAM signal would be. However, the QAM receiver will bring the received CAP signal down to baseband by multiplying it by a carrier which is the center frequency of the CAP signal, which causes the signal to rotate about Fc. Thus, to recover the data, the CAP symbols must have the Fc rotation removed from them. The center frequency can be removed only after all baseband signal processing, since adding back the center frequency to remove the rotation would shift the signal out of baseband. This requires that center frequency derotation be performed when the signal is converted to 1 sample per symbol for equalization or slicing. Accordingly, the derotation of the data must occur after pulse shaping filters 252 and 253 of a QAM receiver such as QAM receiver 250.

Accordingly, in the present invention, derotation is performed by CTL 500. This permits the CTL to track out errors caused by the conversions, as well as recover the original symbol data. The modified CTL comprises a CTL phase error detector 501, which generates a CTL phase error, CTL loop filter 502, adder 510, and NCO 511. Phase error detector 513 generates a CTL phase error by receiving the Data Out signal, as will be appreciated. CTL loop filter 502 generates a signal indicating the frequency and phase error of the processed signal. In standard CTLs, the output of CTL loop filter 502 would be applied directly to the input of NCO 511, which would generate the correct sinusoidal signals to control the multiplication of complex multiplier 261, so as to reduce the error. This is normally used to eliminate the residual rotation and phase error discussed previously. In the present invention, adder 510 and signal Fc are added to allow CTL 500 to also remove the rotation caused by a CAP signal rotating about frequency Fc. When a processor or user determines that a QAM signal is being received, the Fc signal can be switched to zero, so that zero is added to the error signal output by CTL loop filter 502, to mimic the operation of a normal CTL in a QAM receiver when a QAM signal is received.

The Fc switching can be accomplished in various ways. For example, signal Fc could be provided from a switched source which provides either signal Fc or a zero value to adder 510 in response to a control signal from a sensor network which identifies the presence or absence of a CAP signal. For example, a viewer may select a video program from a menu display. Mapping associated with the selection and with the provider of the selected source material would provide an identifier signal indicating that the selected material will be conveyed by CAP or QAM format. The identifier would be sensed eg., by a comparator, to develop the control signal.

As will be appreciated, in alternative embodiments, the modified QAM receivers and components of the present invention may be implemented partially or completely in digital signal processing software on a processor. An analog system may or may not need an NCO. A fixed NCO is suitable for generating the 1, 0, –1, 0 demodulation sequence mentioned previously.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A receiver for processing a carrierless AM/PM (CAP) analog signal comprising:
    first means for causing the CAP signal to rotate about the center frequency of the CAP signal comprising:
        an oscillator responsive to said CAP signal for upconverting said analog CAP signal to a higher frequency which is within a passband frequency;
        filter means responsive to said upconverted analog CAP signal for filtering said higher frequency within the passband;
        translator means responsive to said filter means for centering the frequency of the filtered analog CAP signal to a frequency related to an analog-to-digital (A/D) sample rate of the receiver; and
        a demodulator responsive to said translator means for demodulating said frequency-converted filtered analog CAP signal to bring said CAP signal to baseband, said demodulator including an analog-to-digital converter said demodulated CAP signal rotating about; and
    second means for removing the rotation of the CAP signal about the center frequency.

2. The receiver according to claim 1, wherein said second means includes a carrier tracking loop (CTL) comprising a CTL loop filter having an output, an adder having first and second inputs, the first input of the adder coupled to the output of the CTL loop filter, and a CTL oscillator having an input coupled to the output of the adder, wherein the second input of the adder is coupled to a derotation signal, wherein the derotation signal has a nonzero value sufficient to cause the CTL to remove the rotation of the CAP signal about the center frequency.

3. The receiver according to claim 1, wherein said demodulator comprises a 1,0,–1,0 sequence demodulator, and wherein said frequency related to the analog-to-digital sample rate of the receiver is one-quarter of the A/D sample rate.

4. The receiver according to claim 1, wherein said receiver is a quadrature amplitude modulated (QAM) receiver.

5. A receiver for processing a carrierless AM/PM (CAP) analog signal comprising:
    first means for causing the CAP signal to rotate about the center frequency of the CAP signal comprising:
        an analog-to-digital (A/D) converter for converting the CAP signal from analog to digital, said CAP signal input to said A/D converter having a frequency other than one-quarter of the analog-to-digital sampling frequency;
        a digital demodulator coupled to the output of said A/D converter comprising a full multiplier and a numerically controlled oscillator for shifting said CAP signal to baseband; and
    second means for removing the rotation of the CAP signal about the center frequency, wherein said second means includes a carrier tracking loop (CTL) comprising a CTL loop filter having an output, an adder having first and second inputs, the first input of the adder coupled to the output of the CTL loop filter, and a CTL oscillator having an input coupled to the output of the adder, wherein the second input of the adder is coupled to a derotation signal, and wherein the derotation signal has a nonzero value sufficient to cause the CTL to remove the rotation of the CAP signal about the center frequency.

6. A method for processing a carrierless AM/PM (CAP) analog signal in a quadrature amplitude modulated (QAM) receiver, comprising the steps of:
    causing the CAP signal to rotate about the center frequency of the CAP signal by:
        upconverting said analog CAP signal to a higher frequency which is within a pass band frequency;
        filtering said higher frequency within the pass band;
        converting the frequency of the filtered analog CAP signal to a frequency related to an analog to digital (A/D) sample rate of the receiver;
        demodulating the frequency converted filtered analog CAP signal including performing analog to digital conversion; and
    removing the rotation of the demodulated CAP signal about the center frequency.

7. The method according to claim 6, wherein the step of removing the rotation of the CAP signal is performed by a carrier tracking loop of the quadrature amplitude modulated (QAM) receiver upon completion of baseband signal processing comprising:
    filtering said demodulated CAP signal to generate a filtered signal indicative of the frequency and phase error of the demodulated signal;
    adding a signal having a center frequency of the CAP signal to said filtered signal to generate a combined signal; and processing said combined signal via a numerically controlled oscillator to remove the rotation of the CAP signal about the center frequency.

8. A method for processing a carrierless AM/PM (CAP) signal comprising:

causing the CAP signal to rotate about the center frequency of the CAP signal by:
performing analog-to-digital (A/D) conversion of the CAP signal wherein said CAP signal prior to the A/D conversion has a frequency other than ¼ of the A/D sampling frequency;
demodulating the A/D converted CAP signal using a digital demodulator comprising a full multiplier and a numerically controlled oscillator for shifting the CAP signal to baseband; and removing the rotation of the CAP signal about the center frequency by:
filtering the baseband signal to generate a filtered signal indicative of the frequency and phase error of the demodulated signal;
adding a signal having a center frequency of the CAP signal to said filtered signal to generate a combined signal; and processing said combined signal via a numerically controlled oscillator to remove the rotation of the CAP signal about the center frequency.

* * * * *